United States Patent
Nehls

(10) Patent No.: US 10,535,238 B2
(45) Date of Patent: Jan. 14, 2020

(54) BARBED TAPE AND SECURITY SENSOR ASSEMBLY

(71) Applicant: UNISTRUT INTERNATIONAL CORPORATION, Harvey, IL (US)

(72) Inventor: Charles O. Nehls, Allen Park, MI (US)

(73) Assignee: UNISTRUT INTERNATIONAL CORPORATION, Harvey, IL (US)

(*) Notice: Subject to any disclaimer, the term of this patent is extended or adjusted under 35 U.S.C. 154(b) by 174 days.

(21) Appl. No.: 15/826,934

(22) Filed: Nov. 30, 2017

(65) Prior Publication Data

US 2018/0151038 A1  May 31, 2018

Related U.S. Application Data

(60) Provisional application No. 62/428,165, filed on Nov. 30, 2016.

(51) Int. Cl.
| | | |
|---|---|---|
| *G08B 13/12* | (2006.01) | |
| *G01H 1/00* | (2006.01) | |
| *F41H 11/08* | (2006.01) | |

(52) U.S. Cl.
CPC ........... *G08B 13/122* (2013.01); *F41H 11/08* (2013.01); *G01H 1/00* (2013.01)

(58) Field of Classification Search
CPC ............................... G08B 13/122; G01H 1/12
USPC ......................................................... 340/566
See application file for complete search history.

(56) References Cited

U.S. PATENT DOCUMENTS

| | | |
|---|---|---|
| 4,906,975 A | 3/1990 | Casella et al. |
| 4,978,943 A | 12/1990 | Mainiero et al. |
| 5,216,502 A | 6/1993 | Katz |
| 5,392,027 A | 2/1995 | Brunot et al. |
| 5,438,316 A | 8/1995 | Motsinger et al. |
| 5,530,430 A | 6/1996 | Pavlov |
| 6,087,934 A | 7/2000 | Golab |
| 6,601,830 B1 | 8/2003 | Pavlov |
| 7,123,785 B2 | 10/2006 | Iffergan |
| 7,290,756 B2 | 11/2007 | Pavlov |
| 7,325,787 B1 | 2/2008 | Gibbs |
| 7,481,444 B1 | 1/2009 | Pavlov |
| 7,532,118 B2 * | 5/2009 | Gitelis ................. G08B 13/122 200/61.45 R |
| 7,889,075 B2 | 2/2011 | Winkler et al. |
| 7,896,317 B2 | 3/2011 | Pavlov |
| 7,952,021 B2 | 5/2011 | Allen |
| 8,157,491 B2 | 4/2012 | Pavlov |
| 8,851,456 B2 | 10/2014 | Kosedag |
| 9,183,713 B2 | 11/2015 | Doyle |
| 9,335,482 B2 | 5/2016 | Hao et al. |

FOREIGN PATENT DOCUMENTS

| | | |
|---|---|---|
| DE | 69112842 T2 | 7/1992 |
| EP | 0663655 A3 | 7/1995 |
| EP | 0563303 B1 | 9/1995 |

* cited by examiner

*Primary Examiner* — John E Chapman, Jr.

(57) ABSTRACT

Exemplary approaches herein provide a barbed tape and security sensor assembly. In one approach, a barbed tape and security sensor assembly includes a vibration detection system including a sensor wire and a sensor housing, the sensor wire configured to be secured to a barrier for detecting vibration in the barrier. The barbed tape and security sensor assembly further includes a barbed tape directly coupled to the sensor housing or the sensor wire by a bracket.

20 Claims, 4 Drawing Sheets

BARBED TAPE AND SECURITY SENSOR ASSEMBLY

CROSS-REFERENCE TO RELATED APPLICATION

This application claims priority to U.S. Provisional Patent Application No. 62/428,165, filed Nov. 30, 2016, entitled "BARBED TAPE AND SECURITY SENSOR ASSEMBLY," and incorporated by reference herein in its entirety.

BACKGROUND OF THE DISCLOSURE

Field of the Disclosure

The present disclosure relates to security sensor assemblies and, more particularly, to an assembly including a bracket for securing together barbed tape and a security sensor system.

Discussion of Related Art

Security barrier or fence systems that are capable of sensing tamper related activity on a fence or sensor wire are well known in the security industry. A wire fence system is one in which one or more wires are held in tension between two supports. An end support may be any support where the wire of the fence is terminated, such as at a fixed post or another fixed physical structure, e.g., a wall. A wire fence may include a number of intermediate supports, but need not do so.

One method of breaching a security fence is to cut the wires of the fence. This kind of breach may be detected by electrical signals that are interrupted by a cut wire and can then sound an alarm for the particular security zone being breached. Another method by which an intruder can breach a security fence is by climbing the fence. This can result in the fence wires deflecting downwards and connecting together as a short circuit, which can be detected as loss or reduction of electrical signal through a wire. Yet another method of breaching an electric fence is to deflect the wires of the fence, as can occur by a person climbing onto the wire or otherwise pulling the wires apart to enable an intruder or object to pass through the fence. In such instances the wires may not short or open circuit the signal through the fence. In both electric and conventional fences (not electrified) cutting, bending, or spreading the wires changes the tension or causes vibration in the wires, which can be detected by a sensor. Alarms indicating the location of a potential intrusion may then activate at a central location.

Some known intrusion detection barriers based on the use of optical fibers are known in the prior art. In one type of such barriers, a sensor wire comprising optical fibers is stretched horizontally under tension between posts and is connected at one end to an optical transmitter and at the other end to an optical receiver. Any attempt to climb over the fence results in changes of tension and possibly in damage to the sensor wire, and therefore in a change in the intensity of the light transmitted through it, which is sensed by the optical receiver, and activates an alarm.

Security barriers may also include barbed wire or razor foil type protection. Barbed tape typically employs razor-sharp barb clusters that can be more than two inches in length. The barbed tape is designed to injure persons coming into contact with it, and is designed to discourage breach attempts by its appearance as well. Barbed tape barriers also are typically stronger and harder to crush than barbed wire.

A number of variations of barbed tape are known. Most variations exhibit the same general features, i.e., sharp barbs connected to a central metal strip that may be curved into a generally helical shape.

SUMMARY OF THE DISCLOSURE

One approach according to the disclosure includes an assembly having a vibration detection system including a sensor wire and a sensor housing, and a bracket directly coupling the vibration detection system with a barbed tape.

Another approach according to the disclosure includes a barbed tape and security sensor assembly having a vibration detection system including a sensor wire and a sensor housing, the sensor wire configured to be secured to a barrier for detecting vibration in the barrier. The barbed tape and security sensor assembly further include a barbed tape directly coupled to at least one of the sensor housing and the sensor wire by a bracket.

Yet another approach according to the disclosure includes a bracket assembly having a bracket coupling a barbed tape to at least one of a sensor housing and a sensor wire, the bracket including: a first section affixed to the sensor housing or the sensor wire; and a second section extending from the first section, the second section defining a slot for receiving the barbed tape.

BRIEF DESCRIPTION OF THE DRAWINGS

The accompanying drawings illustrate exemplary approaches of the disclosure, including the practical application of the principles thereof, and in which.

Figure 1:
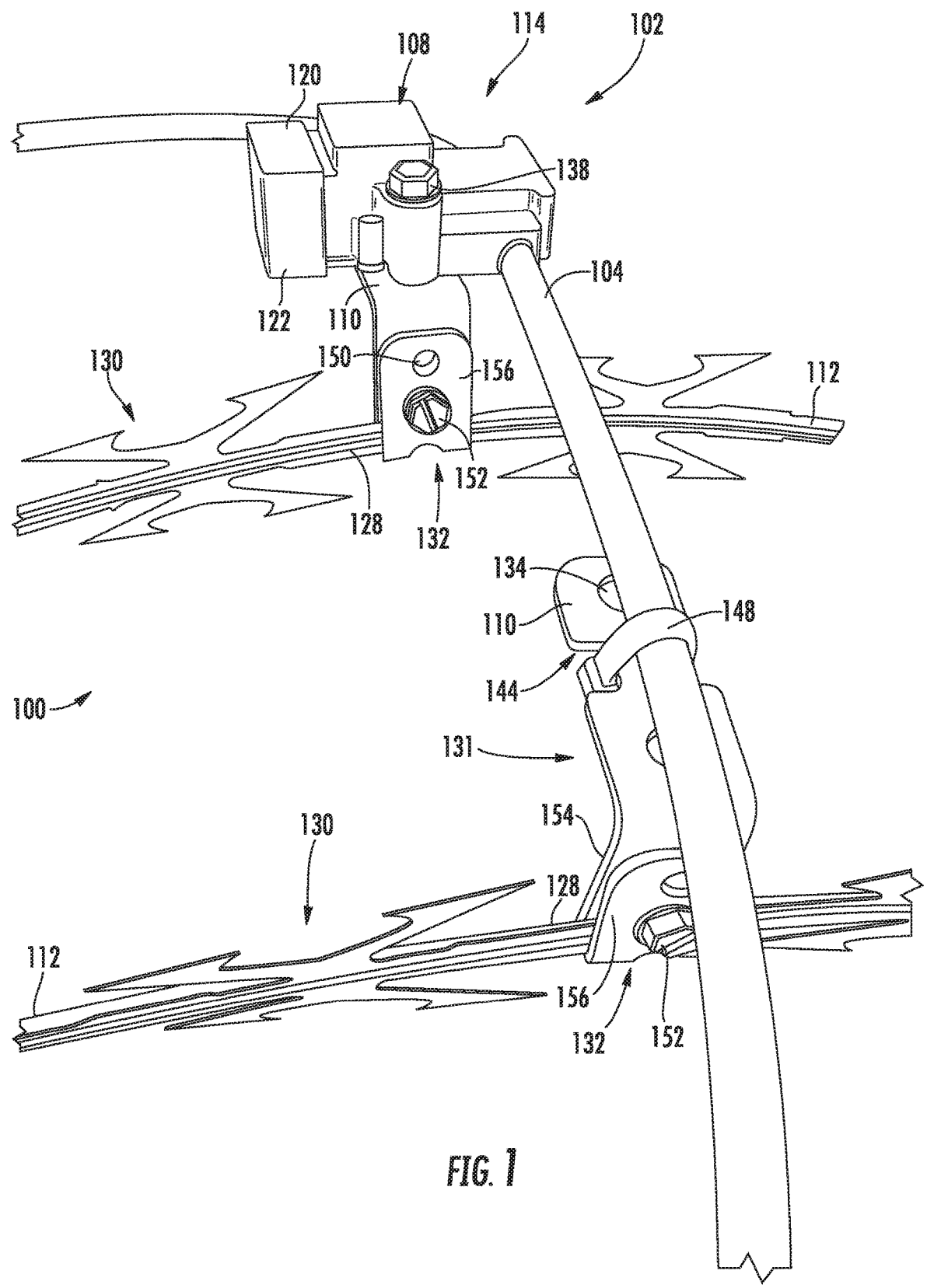
FIG. 1 is a top perspective view of a barbed tape and security system assembly according to exemplary embodiments of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

Exemplary approaches herein provide a barbed tape and security sensor assembly. In one approach, a barbed tape and security sensor assembly includes a vibration detection system including a sensor wire and a sensor housing, the sensor wire configured to be secured to a barrier for detecting vibration in the barrier. The barbed tape and security sensor assembly further includes a barbed tape directly coupled to at least one of the sensor housing and the sensor wire by a bracket. Beneficially, a single bracket design can be used for securing the barbed tape to both the sensor housing and the sensor wire.

Figure 2:
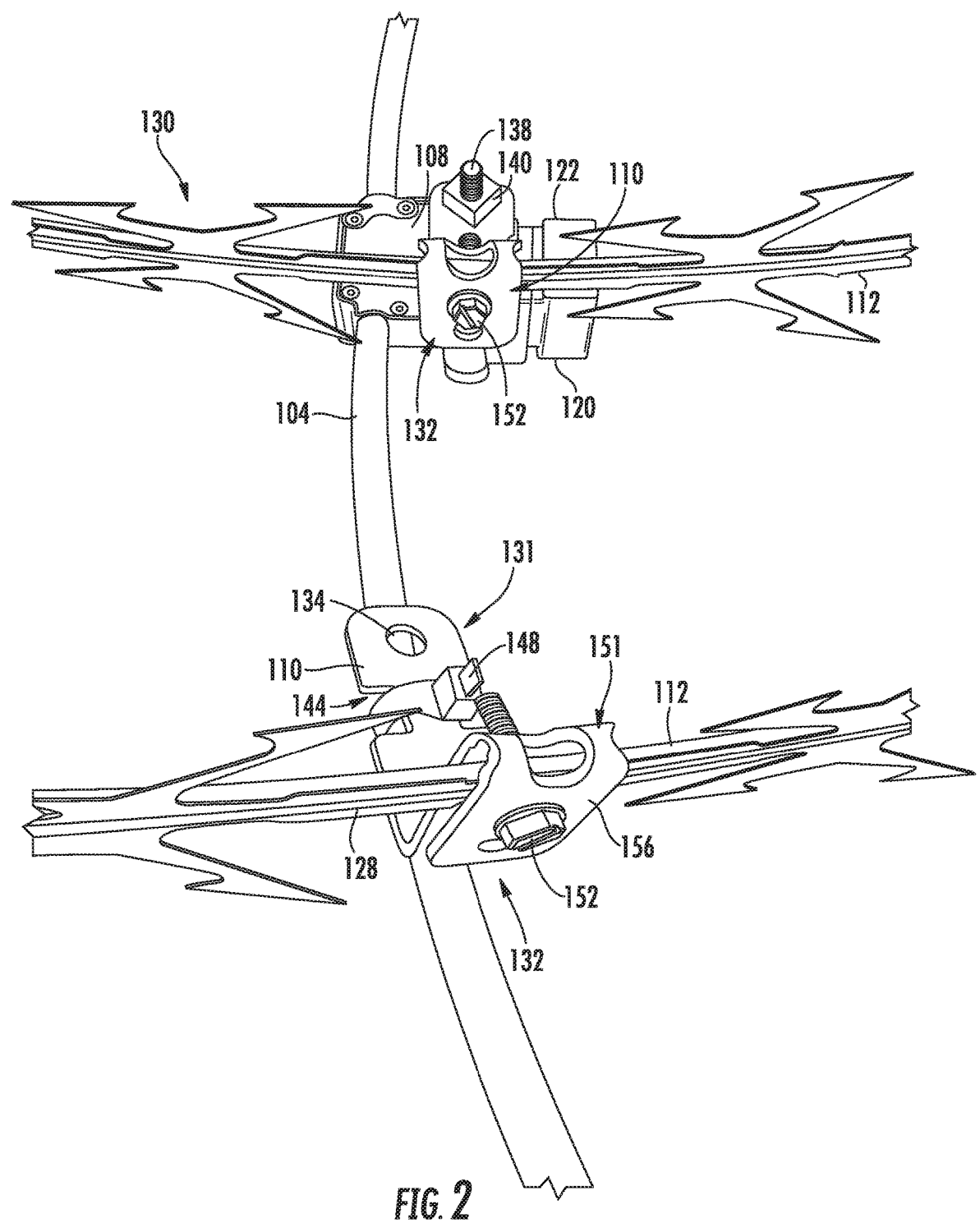
FIG. 2 is a bottom perspective view of the barbed tape and security system assembly of FIG. 1 according to exemplary embodiments of the disclosure.
Figure 3A:
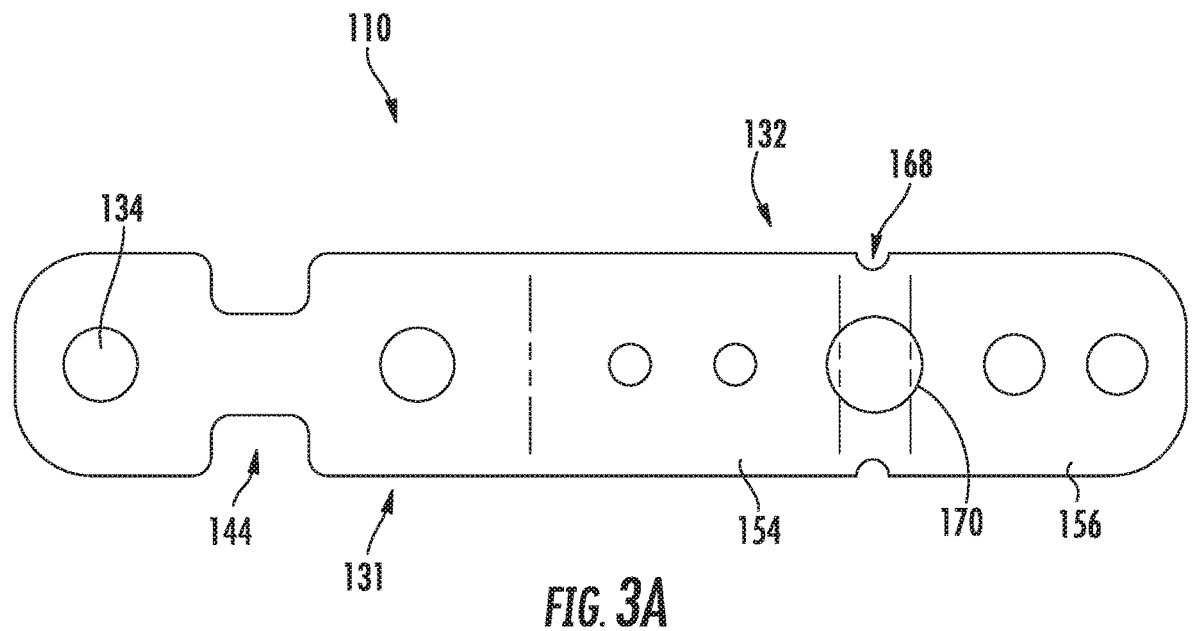
FIG. 3A is a top view of a bracket of the barbed tape and security system assembly of FIG. 1 according to exemplary embodiments of the disclosure.
Figure 3B:
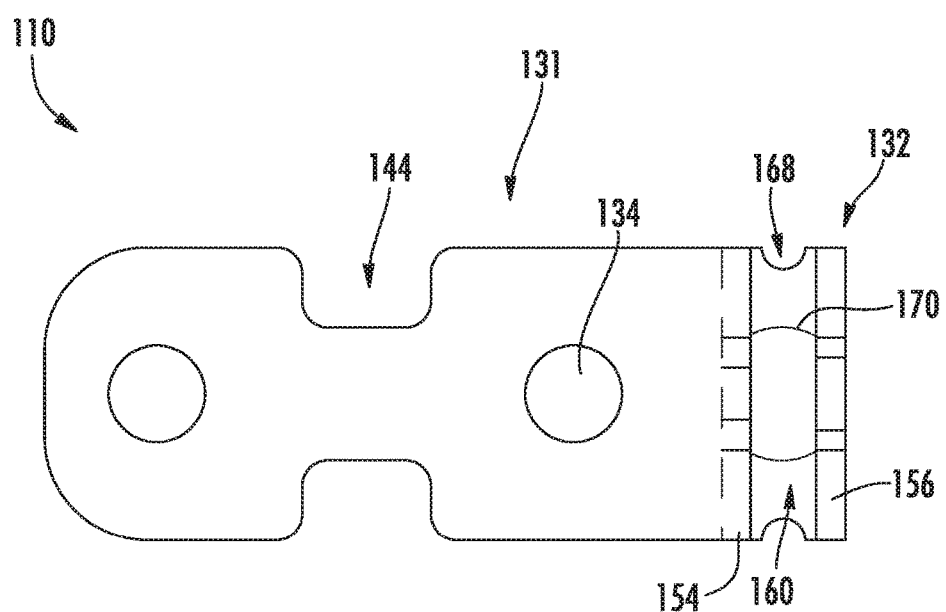
FIG. 3B is a top view of the bracket of FIG. 3A in a crimped configuration according to exemplary embodiments of the disclosure.
Figure 3C:
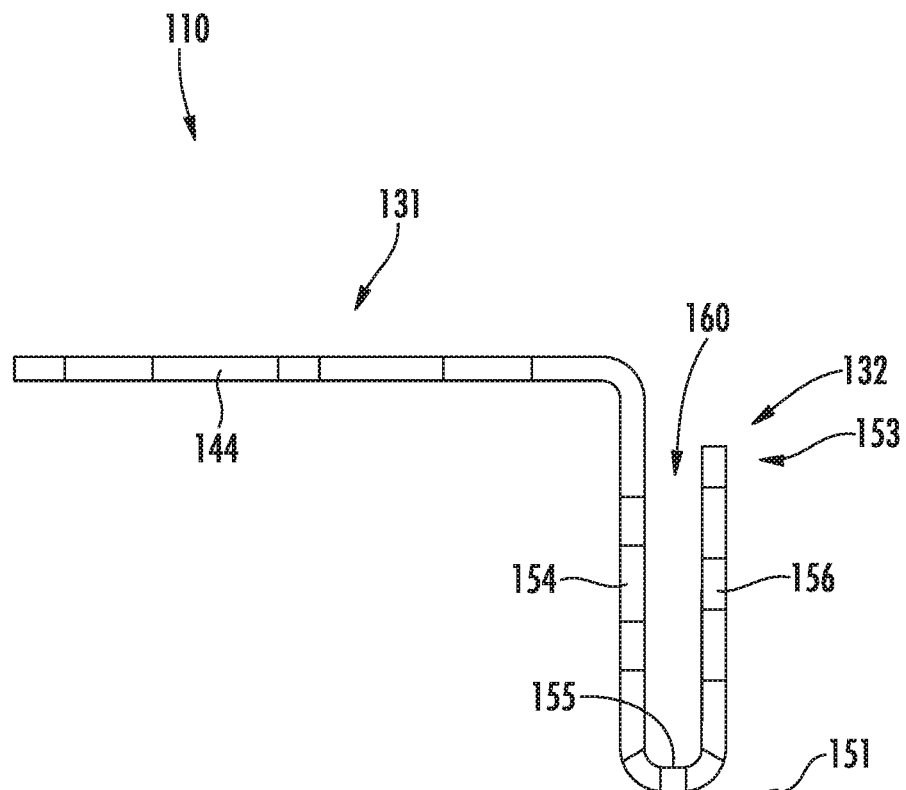
FIG. 3C is a side view of the bracket of the barbed tape and security system assembly of FIG. 3B according to exemplary embodiments of the disclosure.
Figure 3D:
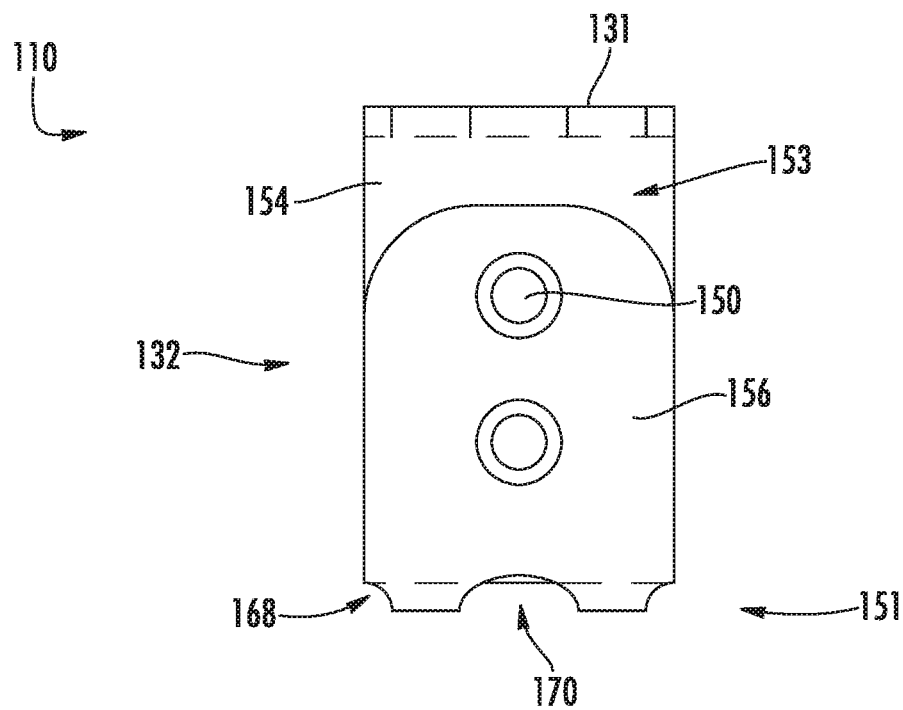
FIG. 3D is an end view of the bracket of the barbed tape and security system assembly of FIG. 3B according to exemplary embodiments of the disclosure.

Turning now to FIGS. 1-2, a barbed tape and security sensor assembly 100 (hereinafter "assembly") will be described in greater detail. As shown, the assembly 100 includes a vibration detection system 102 (hereinafter "system") including a sensor wire 104 and a sensor housing 108, wherein the sensor wire 104 extends through the sensor housing 108. The assembly 100 further includes one or more brackets 110 directly coupling the vibration detection system 102 with a length of barbed tape 112, which may also be known as razor ribbon. As shown, the bracket 110 may be directly physically/mechanically coupled to at least one of the sensor housing 108 and the sensor wire 104.

In some embodiments, the system 102 operates with a barrier structure (not shown) in combination with a monitoring and alert system. In one embodiment, the barrier structure is a fence, such as a chain link fence, which may be formed of a number of interconnected fence sections. In a manner that is known, the fence sections are formed of a series of fence posts, which serve to support fence material. In one exemplary embodiment, the fence material is in the form of chain-link fencing, although it is understood that any other satisfactory fence material or fence construction may be employed.

The system 102 may include a central security station (not shown), a series of perimeter interface controllers connected to the central security station via one or more switches, and a series of sensors in the form of monitoring and alert modules or nodes 114, which are interconnected with the perimeter interface controllers and contained within the sensor housing 108. In a representative application, the node 114 may be secured to a section of the fence, and may be connected to other nodes (not shown) in series via the sensor wire 104. The nodes 114 may be operable to detect movement of fence material and/or vibrations in the sensor wire 104, as well as movements within the vicinity of fence. Each node 114 is operable to convey signals indicating such movements of the sensor wire 104 to the security station for security purposes.

As shown, each node 114 generally includes the sensor housing 108 within which various sensing, monitoring and alert components are contained. The sensor housing 108 may include a first side 120 and a second side 122 generally opposite the first side 120, wherein the bracket 110 may be secured to either the first or second sides 120, 122. The sensor housing 108 and/or the sensor wire 104 may be securely fastened to the fence material so that any movement of the fence material also results in movement of the sensor housing 108 and/or the sensor wire 104. In the illustrated embodiment, the first and second sides 120, 122 are configured and adapted to be secured together to form a sealed, weatherproof interior volume within which the sensing, monitoring and alert components of the node 114 are contained. In one embodiment, the first and second sides 120, 122 are adapted to be connected together by sonic welding, adhesive, etc., so as to provide a sealed, weather-tight interior of the sensor housing 108. Alternatively, the first and second sides 120, 122 of the housing 108 may be secured together using mechanical fasteners such as screws, rivets or nuts and bolts, with appropriate seals or gaskets being located at the interfaces therebetween. The latter construction enables the housing sections to be disassembled and reassembled, such as for service, maintenance or repair.

In exemplary embodiments, the barbed tape 112 includes a central support section 128 and a set of barb clusters 130 extending from the central support section 128. As shown, the bracket 110 is secured about the central support section 128. In one non-limiting embodiment, the barbed tape 112 may include an elongated strip of metal corresponding to the central support section 128, which may be bent slightly along its longitudinal axis in such a way that the strip substantially forms a helix. The helical structure is effective for preventing intrusions across the barrier because barbs at the top of the barbed tape extend directly toward a would-be intruder. Structural patterns other than helical are also possible. For example, the structure could be a concertina pattern where adjacent loops of helical coils are attached to one another at specified points on the circumference. As shown, the barb clusters 130 extend from opposing sides of the central support section 128. In some non-limiting embodiments, the barbs are in clusters of four barbs, with a pair of barbs extending from each side of the central support section 128. Each pair of barbs includes two barbs extending in each opposing longitudinal direction.

Referring now to FIGS. 1-3D, the bracket 110 of the assembly 100 will be described in greater detail. In exemplary embodiments, the bracket 110 may include a first section 131 affixed to an exterior (e.g., the first or second sides 120, 122) of the sensor housing 108, and a second section 132 extending from the first section 131. As shown, the first section 131 and the second section 132 are oriented perpendicular, or substantially perpendicular, with respect to one another when crimped/folded. In some embodiments, the first section 131 includes one or more openings 134 and a fastener 138 for securing the bracket 110 to the sensor housing 108. The fastener 138 may be a threaded fastener (e.g., a bolt) secured by a nut 140, wherein the threaded fastener extends through the first side 120 and the second side 122 of the sensor housing 108. However, it will be appreciated any number or variety of connectors/fasteners may be used of to secure the bracket 110 to the sensor housing 108. For example, in other embodiments, the sensor housing 108 includes a back cover (not shown) that serves as a clamping mechanism for attachment to a chain link fence. As assembled, the cover attaches to the back of the sensor housing 108 from the opposite side of the fence, trapping a section of the chain link fence between the cover and the sensor housing 108. The cover is attached to the sensor housing 108 by two barbed fasteners that engage holes in the sensor housing 108, not permitting disassembly. The bracket 110 may utilize these same two holes in the sensor housing 108, permitting attachment in a similar manner. In order of assembly, the sensor housing 108, the bracket 110, and the back cover may all be assembled using the same barbed fasteners.

As further shown, the first section 131 may include an indentation 144, or a pair of slots, formed on opposite sides of the first section 131. In one embodiment, the indentation 144 may be positioned between each of the openings 134 formed through the first section 131. The indentation 144 is configured to receive a fastener 148, which may be a tie, clasp, or clamp extending around the sensor wire 104. The indentation 144 cut into the sides of the first section functions to fix the location of the clamp or tie used to secure the sensor wire 104 to the bracket 110. Once joined together, the first section 131 is in direct contact with an exterior of the sensor wire 104.

As still further shown, the second section 132 defines a closed end 151 and a free or open end 153, wherein the barbed tape 112 is secured proximate an interior surface 155 of the closed end 151. The second section 132 of the bracket 110 may include a first section or leg 154 and a second section or leg 156 arranged in a u-shape and defining a slot 160 for receiving the barbed tape 112 therebetween. The first leg 154 and the second leg 156 may be oriented parallel, or substantially parallel, to one another, and may be positioned on opposite sides of the barbed tape 112 once the barbed tape 112 is positioned within the slot 160.

In some embodiments, the second section 132 of the bracket 110 includes a second opening 150 and a second fastener 152 for securing the bracket 110 to the barbed tape 112. The second fastener 152 may be a threaded fastener (e.g. a bolt or screw) extending through the first leg 154 and the second leg 156 of the second section 132 of the bracket 110. Multiple openings 150 may be provided through the second section 132 to accommodate different sizes of barbed tape. As shown, the second fastener 152 is configured to prevent the barbed tape 112 from exiting the slot 160 at the open end 153. During assembly, the barbed tape 112 may be inserted into the slot 160, and the fastener 152 then tightened around the barbed tape 112. As further shown, the closed end 151 of the second section 132 includes a set of radial notches 168 formed therein to facilitate the clamping action of the second section 132. For similar reasons, an opening 170 may be provided in the center of the closed end 151. Furthermore, a width of the second section 132 of the bracket is selected to align with a notch (not shown) provided on either side of the barbed tape 112 to improve an ability of the second section 132 to remain in the proper location. Still another benefit provided by the second section 132 is the stand-off provided by the depth of the u-shaped bend at the closed end 151, which prevents chaffing of the sensor wire 104 against the barbed tape 112, a common failure point in conventional designs.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. An assembly comprising:
   a vibration detection system including a sensor wire and a sensor housing; and
   a bracket directly coupling the sensor housing of the vibration detection system with a barbed tape, and a second bracket directly coupling the sensor wire with a second barbed tape, wherein the sensor wire extends outside the sensor housing, and wherein the sensor wire is in direct physical contact with the second bracket.

2. The assembly of claim 1, wherein the sensor wire extends through the sensor housing.

3. The assembly of claim 1, wherein the bracket comprises:
   a first section affixed to an exterior of the sensor housing; and
   a second section extending from the first section, the second section defining a slot for receiving the barbed tape.

4. The assembly of claim 3, wherein the first section includes a first opening and a first fastener for securing the bracket to the sensor housing.

5. The assembly of claim 4, wherein the first fastener is a threaded fastener extending through a first side and a second side of the sensor housing.

6. The assembly of claim 3, wherein the second section includes a second opening and a second fastener for securing the bracket to the barbed tape.

7. The assembly of claim 6, wherein the second fastener is a threaded fastener extending through a first leg and a second leg of the second section of the bracket.

8. The assembly of claim 7, the first leg and the second leg positioned on opposite sides of the barbed tape.

9. The assembly of claim 3, the first section including an indentation receiving a third fastener, the third fastener extending around the sensor wire.

10. The assembly of claim 3, wherein the first section and the second section are oriented substantially perpendicular to one another.

11. The assembly of claim 3, the barbed tape comprising a central support section and a set of barb clusters extending from the central support section, wherein the second section is secured to the central support section.

12. A barbed tape and security sensor assembly comprising:
   a vibration detection system including a sensor wire and a sensor housing, the sensor wire configured to be secured to a barrier for detecting vibration in the barrier;
   a barbed tape coupled to the sensor housing and the sensor wire by a bracket; and
   a second barbed tape coupled to the sensor wire and a second bracket, wherein the sensor wire extends outside the sensor housing, and wherein the sensor wire is in direct physical contact with the second bracket.

13. The barbed tape and security sensor assembly of claim 12, wherein the sensor wire extends through the sensor housing.

14. The barbed tape and security sensor assembly of claim 12, wherein the bracket comprises:
   a first section affixed to an exterior of the sensor housing; and
   a second section extending from the first section, the second section defining a slot for receiving the barbed tape.

15. The barbed tape and security sensor assembly of claim 14, wherein the first section includes a first opening and a first fastener for securing the bracket to the sensor housing.

16. The barbed tape and security sensor assembly of claim 15, wherein the first fastener is a threaded fastener extending through a first side and a second side of the sensor housing.

17. The barbed tape and security sensor assembly of claim 14, wherein the second section includes a second opening and a second fastener for securing the bracket to the barbed tape.

18. The barbed tape and security sensor assembly of claim 17, wherein the second fastener is a threaded fastener extending through a first leg and a second leg of the second section of the bracket.

19. The barbed tape and security sensor assembly of claim 18, the first leg and the second leg positioned on opposite sides of the barbed tape.

20. An assembly, comprising:
   a vibration detection system including a sensor wire extending through a sensor housing; and
   a first bracket directly coupling the sensor housing with a first barbed tape, and a second bracket directly coupling the sensor wire with a second barbed tape, wherein the sensor wire extends outside the sensor housing, and wherein the sensor wire is in direct physical contact with the second bracket for detecting a vibration in the second barbed tape.

* * * * *